United States Patent
Young (10) Patent No.: US 8,217,909 B2
(45) Date of Patent: Jul. 10, 2012

(54) MULTI-FINGER SUB-GESTURE REPORTING FOR A USER INTERFACE DEVICE

(75) Inventor: David W. Young, Meridian, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 732 days.

(21) Appl. No.: 12/339,317

(22) Filed: Dec. 19, 2008

(65) Prior Publication Data

US 2010/0156804 A1    Jun. 24, 2010

(51) Int. Cl.
G06F 3/041    (2006.01)
G06F 3/01    (2006.01)
(52) U.S. Cl. .................................. 345/173; 715/702
(58) Field of Classification Search .................. None
See application file for complete search history.

(56) References Cited

U.S. PATENT DOCUMENTS

| | | | |
|---|---|---|---|
| 2006/0026521 A1* | 2/2006 | Hotelling et al. | 715/702 |
| 2008/0180406 A1* | 7/2008 | Han et al. | 345/173 |
| 2008/0316183 A1* | 12/2008 | Westerman et al. | 345/173 |
| 2010/0149115 A1* | 6/2010 | Park et al. | 345/173 |

* cited by examiner

Primary Examiner — Daniell L Negron (57) ABSTRACT

Touch sensor methods, devices and systems are disclosed. One embodiment of the present invention pertains to a method for reporting a sub-gesture on a touch sensing surface, e.g., laid over a display of a user interface device. The method comprises determining a number of fingers simultaneously placed on the touch sensing surface. The method also comprises periodically sampling respective position data of the fingers moving along the touch sensing surface and calculating event data based on the position data, wherein each of the event data includes a geometric shape associated with the number of fingers and a centroid of the geometric shape. The method further comprises forwarding the event data to a presentation layer of application of the user interface device, where the application is configured to identify a gesture based on a subset of the event data.

15 Claims, 7 Drawing Sheets

MULTI-FINGER SUB-GESTURE REPORTING FOR A USER INTERFACE DEVICE

FIELD OF TECHNOLOGY

Embodiments of the present invention relate to the field of electronics. More particularly, embodiments of the present invention relate to a touch sensing device, system and method.

BACKGROUND

A touch screen or touch panel is a display which can detect a location of a touch on the surface of a display screen. The touch may be applied using one or more fingers or an object, such as a stylus, to create a finger gesture. Such a finger gesture may be recognized by using a touch screen divided into a small number of large regions. The finger gesture is then identified by tracking a presence of the finger in each of the regions over time. However, for mobile applications with an already scaled-down touch screen or panel, a small or slight finger movement may not be easily recognized.

Furthermore, once the processor identifies the gesture, one or more applications associated with the touch screen may receive the data indiscriminately. Accordingly, the touch screen may be burdened by a large number of interrupts to process the large data size when it is implemented for a mobile device where its power requirement, processing power and operating system (OS) performance may be the foremost concerns.

SUMMARY

One embodiment of the present invention pertains to a method for reporting a sub-gesture on a touch sensing surface laid over a display of a user interface device. The method may be performed by low level hardware, firmware and software, and comprises determining a number of fingers simultaneously placed on the touch sensing surface. The method also comprises periodically sampling respective position data of the fingers moving along the touch sensing surface and calculating event data based on the position data, where each of the event data includes a geometric shape associated with the number of fingers and a centroid of the geometric shape. The method further comprises forwarding the event data to an application of the user interface device, where the application is operable for identifying a gesture based on a subset of the event data. The event data may be forwarded as system-level events to presentation layer applications, such as a graphical user interface (GUI), for instance.

Another embodiment of the present invention pertains to a user interface device with a display. The device comprises a touch sensing surface laid over the display for sensing a multiple-finger gesture applied along the touch sensing surface. In addition, the device comprises a processor for generating multiple position data associated with the multi-finger gesture. Furthermore, the device comprises an operating system for periodically sampling the position data of the fingers and generating event data which includes a geometric shape formed by the fingers as well as the centroid of the geometric shape for each sampled position data. The events may be reported to presentation layer applications that register to receive them. These applications may interpret the events to form a complex gesture.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, device and/or system are disclosed that report sub-gesture data of two or more fingers contacting a touch sensing surface, e.g., laid over a display of a user interface device. According to embodiments of this invention, geometric representations of a multi-finger gesture in components may be forwarded to one or more registered applications which selectively process the components for their gesture recognition processes. That is, the multi-finger gesture can be interpreted differently by each of the applications that process different components of the gesture. This is made easy by separating the process of calculating position data generated in response to the gesture from the process of generating the geometric representations in two different hardware/firmware/software layers.

For example, the position data may be calculated using a processor for controlling the touch sensing surface, whereas the geometric components may be generated by a device driver in the operating system of the user interface device. Then, the components may be selectively processed by one or more applications of the user interface device, e.g., GUI or other presentation layer applications, to identify the gesture based on their respective specifications.

The layered multi-touch hardware/firmware/software stack may provide a multi-finger gesture solution which is not confined by a finite number of pre-defined gestures. Based on the geometric representations of the gesture or sub-gestures, one or more applications of the user interface device may access one or more of the components depending on their specifications. The discriminate processing of the sub-gestures may also ease the processing load of the operating system. Thus, embodiments include a more versatile, efficient multi-touch recognition device and/or method.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the disclosure is intended to cover alternatives, modifications and equivalents, which may be included within the spirit and scope of the invention. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present invention.

Figure 1A:
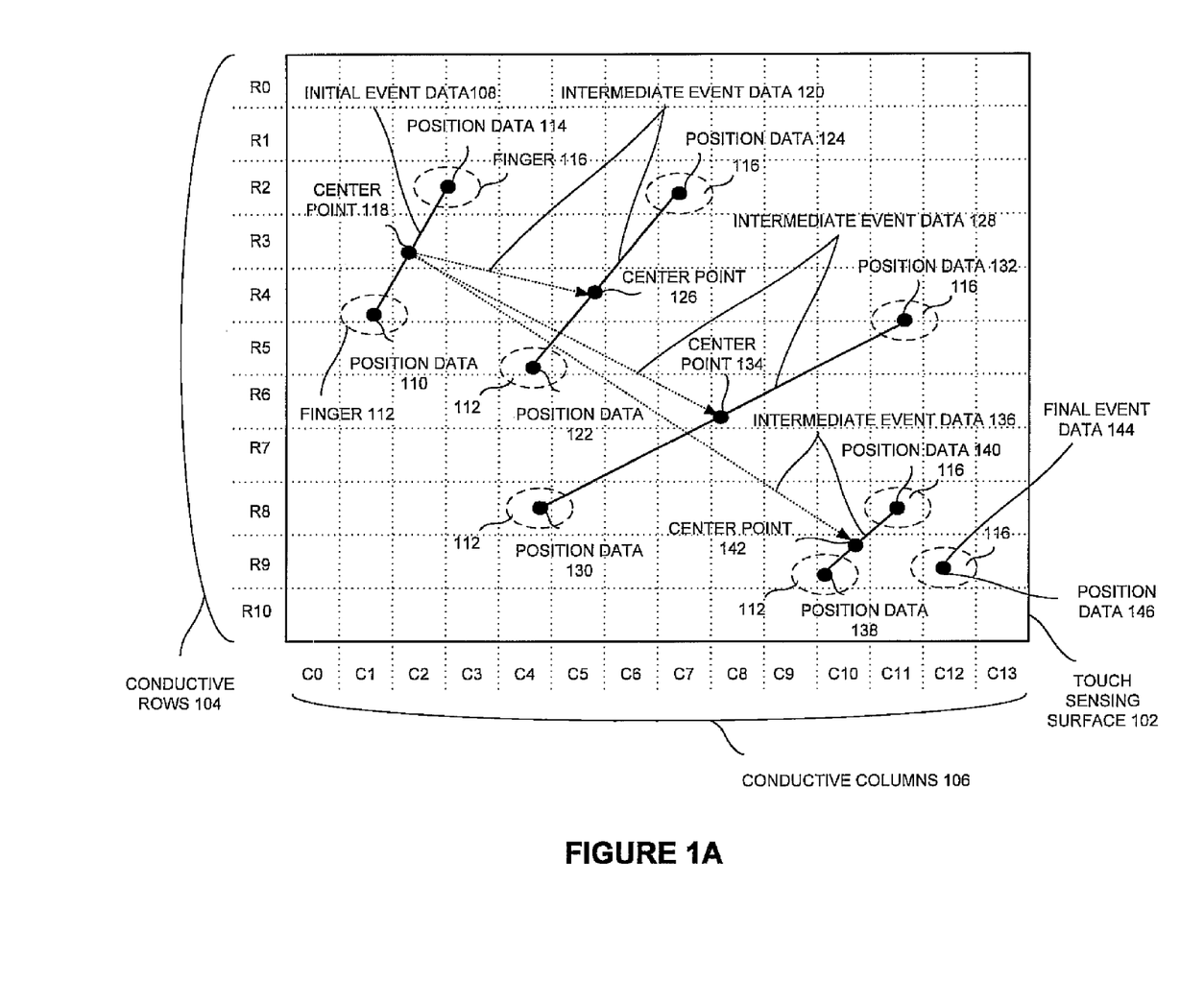
FIG. 1A illustrates an exemplary view of event data generated by a multi-finger gesture on a touch sensing surface, according to one embodiment of the present invention.

FIG. 1A illustrates an exemplary view of event data generated by a multi-finger gesture on a touch sensing surface 102, according to one embodiment of the present invention. More particularly, the figure illustrates two fingers (e.g., a finger 112 and a finger 116) moving along the touch sensing surface 102. In FIG. 1A, multiple event data are displayed on the touch sensing surface 102. In one exemplary implementation, the touch sensing surface 102 may be laid over a display of a user interface device (e.g., a cell phone, a PDA, a mini computer, etc.).

As illustrated in FIG. 1A, the touch sensing surface 102 may be a two layer touch sensing surface. In one embodiment, the two layer touch sensing surface is formed using multiple conductive rows 104 (e.g., R0 through R10) and multiple conductive columns 106 (e.g., C0 through C13). Although the example illustrates a limited number of columns and rows, it is appreciated more number of the conductive rows 104 and columns 106 (e.g., of Indium tin oxide (ITO)) can be formed on the two layer touch sensing surface.

For the two layer touch sensing surface, a capacitance may be sensed bridging a row and a column of the two layer touch sensing surface when a user applies a touch to a spot which crosses the row and column. Thus, position data of the touch may be obtained by scanning the rows and columns and by processing the capacitance formed between the particular row and column.

It is appreciated that a one layer solution or a multiple layer solution may be used in place of the two layer solution. It is also appreciated that the touch sensing surface 102 may be based on one of numerous touch sensing technologies, which include but not limited to a resistive, surface acoustic wave, projected capacitance, strain gauge, optical imaging, dispersive signal technology and acoustic pulse recognition technology as well as the capacitive touch sensing technology described above.

As illustrated in FIG. 1A, when the two fingers (e.g., a thumb and an index finger) simultaneously touch the touch sensing surface 102, the number of the fingers is first determined. In one embodiment, a position data 110 and a position data 114 may be the centroid of the finger 112 and the finger 116, respectively. In one embodiment, the initial placement of the fingers is reported as an initial event data 108, where the initial event data 108 comprises a geometric shape (e.g., a straight line or "baton") formed by the position data 110 and the position data 114 as well as a center point 118 of the geometric shape. It is appreciated that the position data 110 and the position data 114 may be calculated and/or generated by a processor coupled to the touch sensing surface 102.

Then, respective position data of the fingers moving along the touch sensing surface 102 are periodically sampled from all the position data generated by the processor. Moreover, one or more event data based on the position data may be generated based on the sampled position data. In one embodiment, each of the event data includes a straight line and the center point of the straight line. In FIG. 1A, an intermediate event data 120, which includes a straight line based on a position data 122 and a position data 124, a center point 126 and a distance between the center point 118 and the center point 126, is generated.

In addition, an intermediate event data 128, which includes a straight line based on a position data 130 and a position data 132, a center point 134 and a distance between the center point 118 and the center point 134, is generated. Furthermore, an intermediate event data 136, which includes a straight line based on a position data 138 and a position data 140, a center point 142 and a distance between the center point 118 and the center point 142, is generated. Moreover, FIG. 1A illustrates a final event data 144 used to report any change in the number of fingers present on the touch sensing surface 102, thus indicating the end of the multi-finger touch session. In FIG. 1A, the final event data 144 is obtained when one of the two fingers is lifted from the touch sensing surface 102, where the finger 116 is still maintained on the touch sensing surface 102 to generate a position data 146. It is appreciated that the final event data 144 can also be obtained by placing three or more fingers on the touch sensing surface 102, or by lifting both of the two fingers from the touch sensing surface 102.

In one embodiment, the event data may be forwarded to an application of the user interface device, e.g., a presentation layer application, where the application is operable for identifying a gesture based on a subset of the event data or one or more components of the sub-gestures.

Figure 1B:
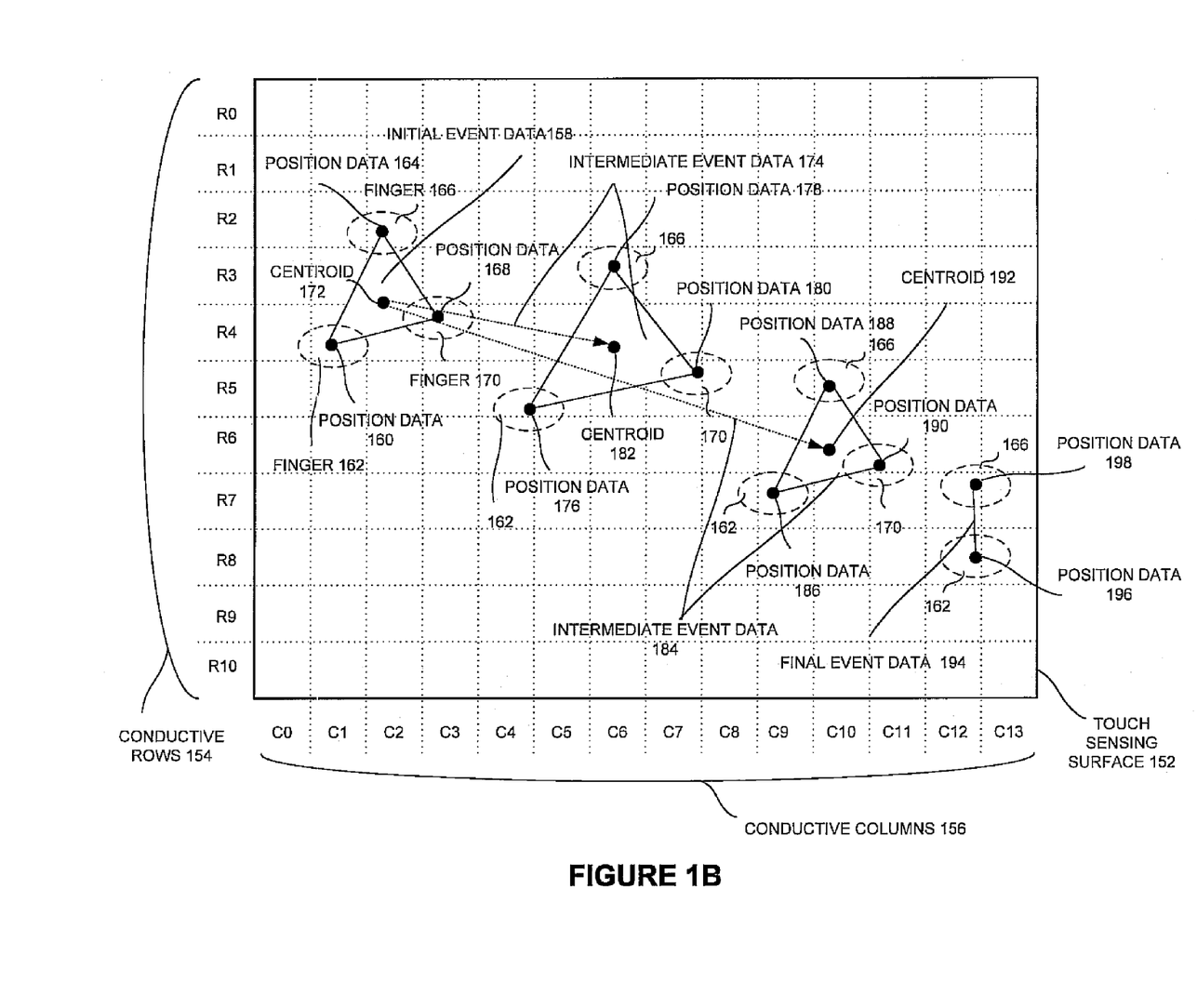
FIG. 1B illustrates another exemplary view of event data generated by a multi-finger gesture on a touch sensing surface, according to one embodiment of the present invention.

FIG. 1B illustrates another exemplary view of event data generated by a multi-finger gesture on a touch sensing surface 152, according to one embodiment of the present invention. More particularly, the figure illustrates three fingers (e.g., a finger 162, a finger 166 and a finger 170) moving along the touch sensing surface 102. In FIG. 1B, multiple event data are displayed on the touch sensing surface 152. In one exemplary implementation, the touch sensing surface 152 may be laid over a display of a user interface device.

As illustrated in FIG. 1B, when the three fingers (e.g., a thumb, an index finger and a middle finger) simultaneously touch the touch sensing surface 152, the number of the fingers is first determined. In one embodiment, a position data 160, a position data 164 and a position data 168 may be the centroid of the finger 162, the finger 166 and the finger 170, respectively. In one embodiment, the initial placement of the fingers is reported as an initial event data 158, where the initial event data 158 comprises a geometric shape (e.g., a triangle) formed by the position data 160, the position data 164 and the position data 168 as well as a centroid 172 of the geometric shape. It is appreciated that the position data 160, 164 and 168 may be calculated and/or generated by a processor coupled to the touch sensing surface 152.

Then, respective position data of the fingers moving along the touch sensing surface are periodically sampled from all the position data generated by the processor. Moreover, one or more event data based on the position data may be generated based on the sampled position data. In one embodiment, each of the event data includes a triangle and the centroid of the triangle. In FIG. 1B, an intermediate event data 174, which includes a triangle based on a position data 176, a position data 178 and a position data 180, a centroid 182 of the triangle and a distance between the centroid 172 and the centroid 182, is generated.

In addition, an intermediate event data 184, which includes a triangle based on a position data 186, a position data 188 and a position data 190, a centroid 192 and a distance between the centroid 172 and the centroid 192, is generated. Although FIG. 1B illustrates the two intermediate event data, it is appreciated that a larger number of the intermediate event data can be generated. Moreover, FIG. 1B illustrates a final event data 194 used to report any change in the number of fingers present on the touch sensing surface 152, thus indicating the end of the multi-finger touch session.

In FIG. 1B, the final event data 194 is obtained when one of the three fingers is lifted from the touch sensing surface 152, where the fingers 162 and 166 are still maintained on the touch sensing surface 152 to generate a position data 196 and a position data 198. It is appreciated that the final event data 194 can also be obtained by placing four or more fingers on the touch sensing surface 152. Additionally, the final event data 194 can be obtained by lifting two or more of the three fingers from the touch sensing surface 152. It is further appreciated that more than three fingers may be used to generate event data which includes a respective geometric shape (e.g., a rectangle for four fingers, a pentagon for five fingers, etc.) and the centroid of the geometric shape.

Figure 2A:
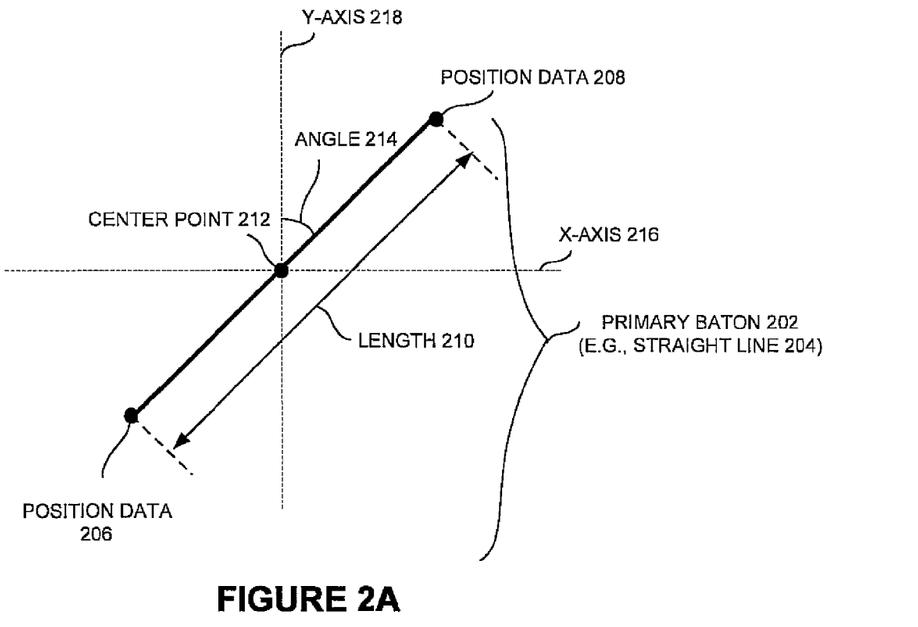
FIG. 2A illustrates an exemplary primary baton in a two dimensional plane formed by two fingers on a touch sensing surface, according to one embodiment of the present invention.

FIG. 2A illustrates an exemplary primary baton 202 in a two dimensional plane (e.g., based on an x-axis 216 and a y-axis 218) formed by two fingers on a touch sensing surface, according to one embodiment of the present invention. In one embodiment, a "baton" may be a geometric representation of positions of the two fingers on the touch sensing surface, where the baton may be represented as a vector with an amount of rotation from the y-axis 218. In FIG. 2A, the primary baton 202 of a straight line 204 formed by two fingers touching the touch sensing surface comprises a length 210, a center point 212 and an angle 204 of the two fingers or the primary baton's rotation from the y-axis 218. As illustrated in FIG. 2A, a position data 206 and a position data 208 may be the centroid of each of the two fingers, respectively.

Figure 2B:
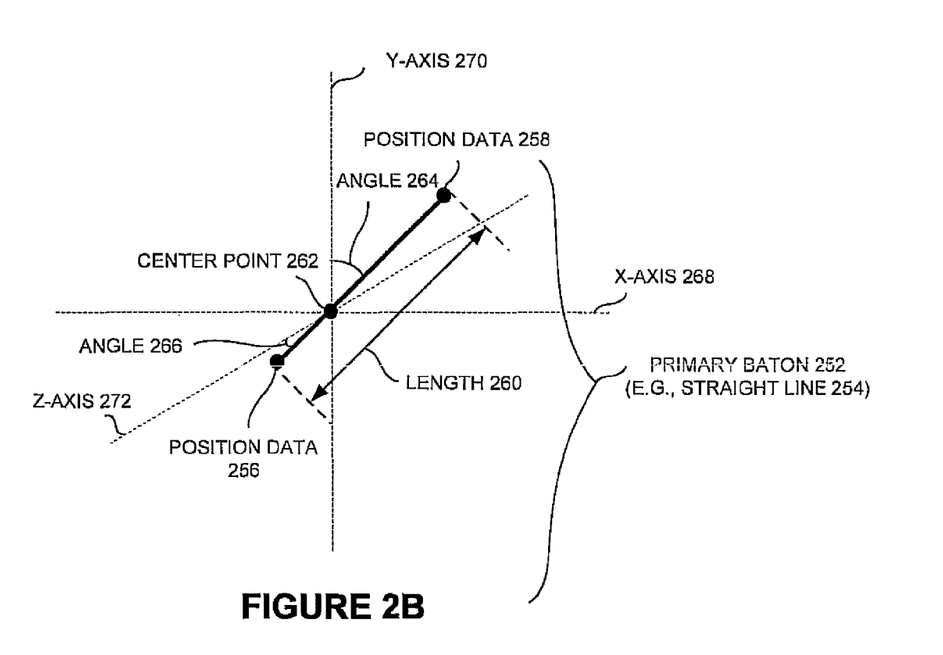
FIG. 2B illustrates an exemplary primary baton in a three dimensional space formed by two fingers on a touch sensing surface, according to one embodiment of the present invention.

FIG. 2B illustrates an exemplary primary baton 252 in a three dimensional space (e.g., a virtual three dimensional space generated on a touch sensing surface based on an x-axis 268, a y-axis 270 and a z-axis 272) formed by two fingers on the touch sensing surface, according to one embodiment of the present invention. It is appreciated that the z-axis 272 is perpendicular to an x-y plane formed by the x-axis 268 and the y-axis 270. In FIG. 2B, the primary baton 252 of a straight line 254 formed by two fingers touching the touch sensing surface comprises a length 260, a center point 262, an angle 264 of the primary baton in the x-z plane from the y-axis 266 and an angle 266 of the primary baton in the x-y plane from the z-axis 272. As illustrated in FIG. 2B, a position data 256 and a position data 258 may be the centroid of each of the two fingers, respectively. Accordingly, the length 260 of the primary baton 252 may appear shorter than the length 210 of the primary baton 202 depending on the user's perspective although the two primary batons may be same in length. It is appreciated that data generated by a finger gesture in the three dimensional space (e.g., which may include the length 260, the center point 262, the angle 264, the angle 266 and more for each primary baton 252) may be received by an application to recognize or interpret the gesture in the three dimensional space.

Figure 3A:
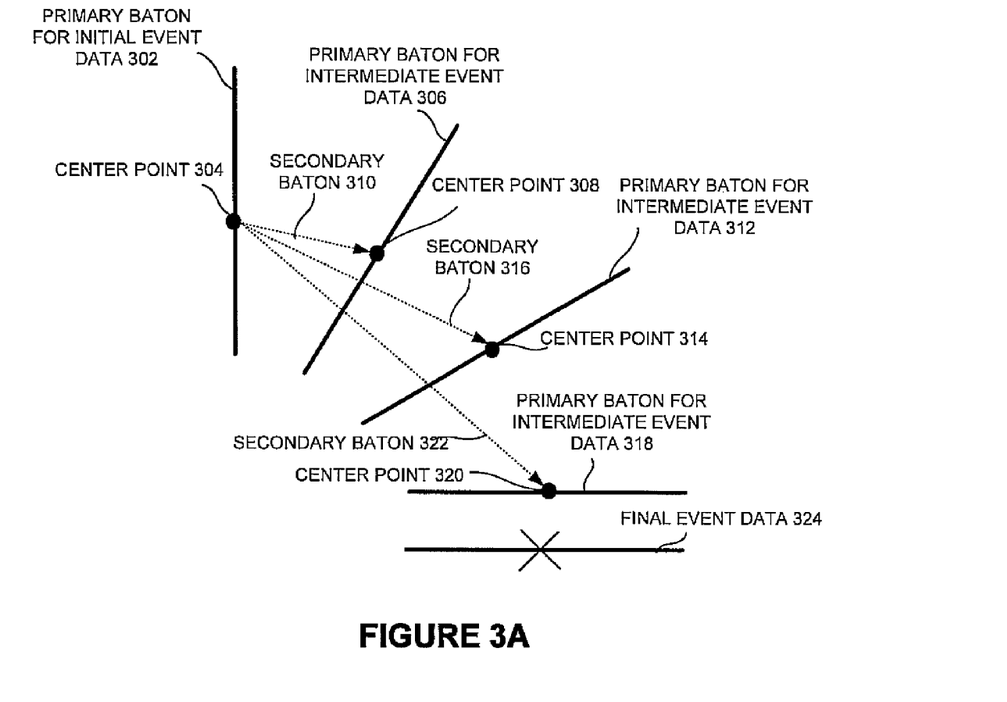
FIG. 3A illustrates a plurality of secondary batons formed by a plurality or primary batons, according to one embodiment of the present invention.

FIG. 3A illustrates a plurality of secondary batons formed by a plurality of primary batons, according to one embodiment of the present invention. In one embodiment, when the initial event data and the final event data are reported, the amount of relocation of each primary baton's center point since the initial event data is represented as a secondary baton. As illustrated in FIG. 3A, a secondary baton 310 is the distance between a primary baton for initial event data 302 with a center point 304 and a primary baton for intermediate event data 306 with a center point 308.

In addition, a secondary baton 316 is the distance between the primary baton for initial event data 302 with the center point 304 and a primary baton for intermediate event data 312 with a center point 314. Furthermore, a secondary baton 322 is the distance between the primary baton for initial event data 302 with the center point 304 and a primary baton for intermediate event data 318 with a center point 320. In one embodiment, the sampling of the primary batons is performed at a regular interval (e.g., 20 ms). A final event data 324 (e.g., any number of fingers except two) may be processed to indicate the completion of the multi-finger gesture. It is appreciated that the embodiments of the secondary batons illustrated in FIG. 3A may be applied to the three dimensional space in a similar fashion.

Figure 3B:
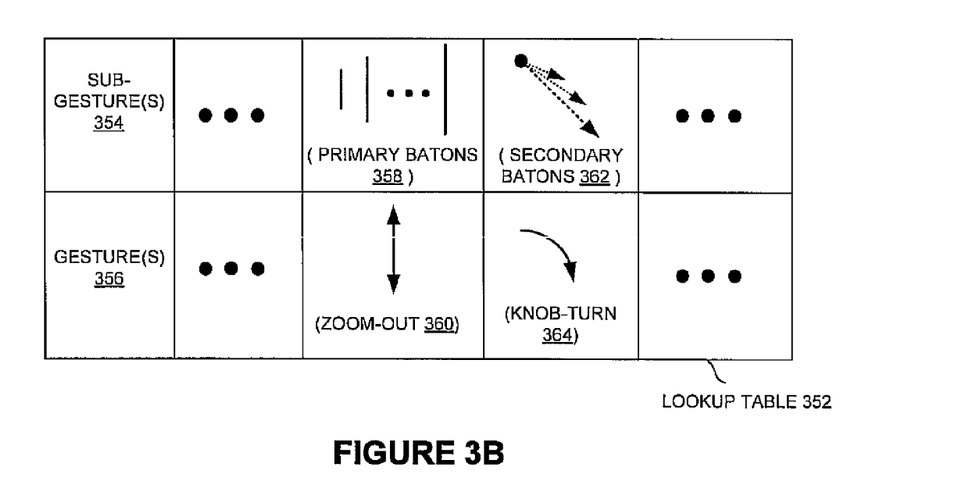
FIG. 3B illustrates an exemplary lookup table for matching sub-gestures with their respective gestures, according to one embodiment of the present invention.

FIG. 3B illustrates an exemplary lookup table 352 for matching sub-gestures 354 with respective gestures 356, according to one embodiment of the present invention. In FIG. 3B, in one embodiment, one or more applications (e.g., graphical user interface programs or other presentation layer applications) can register to receive one or more of the initial, intermediate, and final event data which contains the primary and secondary batons as illustrated in FIG. 3A. The application programs may then interpret the event data as various gestures, depending on the type of control or action that the application programs specify. In one exemplary implementation, the application programs may interpret the gesture as a complex combination of the event data using programming statements and/or lookup tables or gesture definition tables with preconfigured gestures.

For instance, as illustrated in FIG. 3B, a sub-gesture or event data associated with multiple primary batons 358 with their lengths gradually increasing in size may be interpreted as a zoom-out gesture 360. In addition, a sub-gesture or event data associated with multiple secondary batons 362 with their lengths and angles gradually varying as illustrated in FIG. 3B may be interpreted as a knob-turn in clockwise direction 364. For instance, as a user makes a gesture of turning a knob on a touch screen, the user may move his or her fingers in a clockwise direction. As the user makes the gesture using two fingers over time, the secondary batons 362 may be distances measured from the initial center point of the first straight line or primary baton formed by the two fingers to the center points of subsequent straight lines or primary batons. Thus, an application may be registered to receive only the secondary batons 362 (e.g., or the initial center point of the first primary baton and the end points of the secondary batons 362) to interpret the gesture as a clockwise knob-turn by connecting the initial center point and the end points of the secondary batons 362. By doing so, the application can cut down significant amount of unnecessary information it may have to process if it were to receive all the data generated by the gesture. In a similar manner, the applications may subscribe to one or more components of the sub-gestures 354 to interpret the sub-gestures 354 or event data depending on their specifications (e.g., zoom-in, counter-clockwise rotation, horizontal/vertical/diagonal panning, resizing, up/down/left/right, grow/shrink, left/right, etc.).

Figure 4:
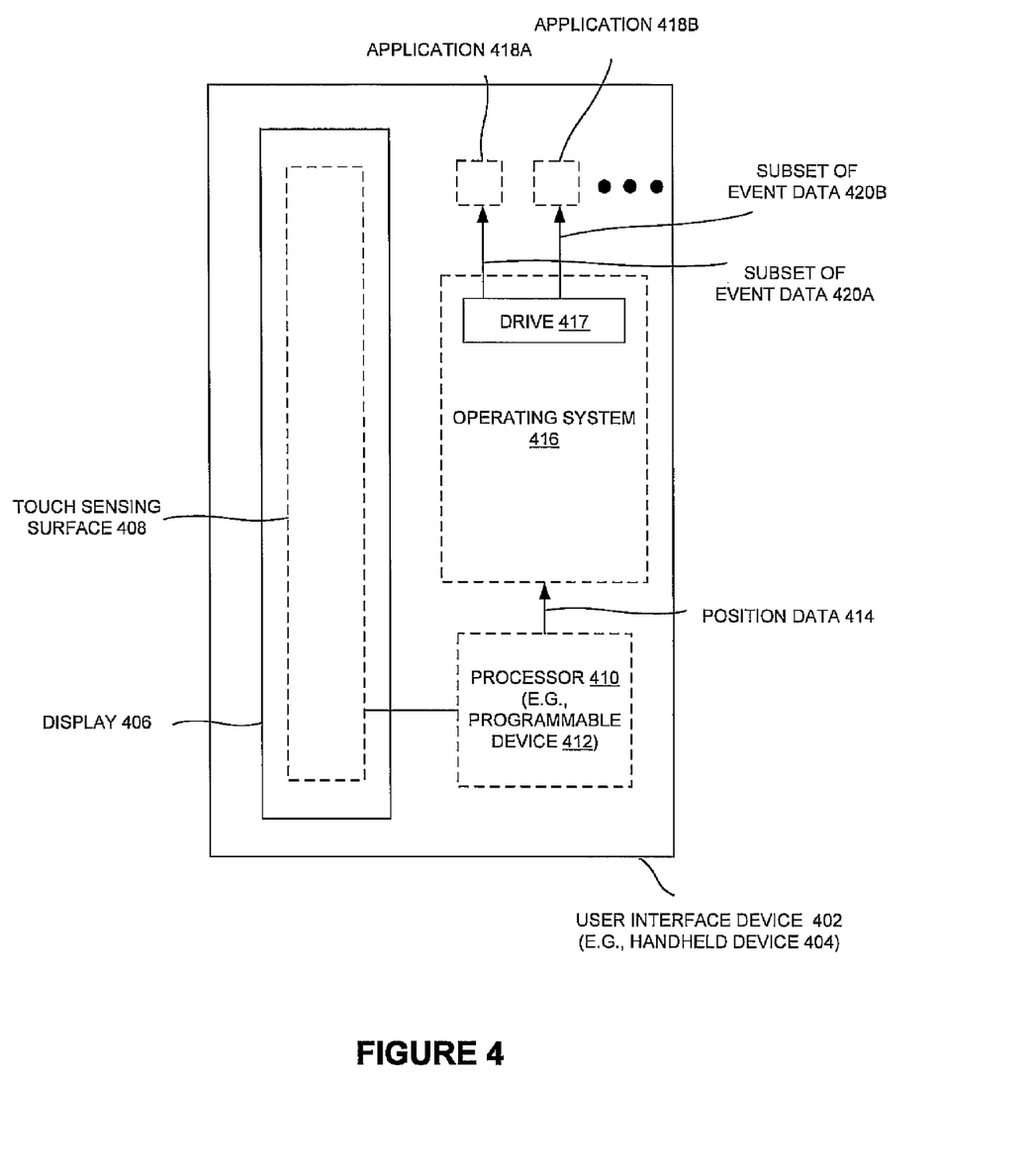
FIG. 4 illustrates an exemplary user interface device with an operating system which generates sub-gesture data based on position data of a multi-finger gesture, according to one embodiment of the present invention.

FIG. 4 illustrates an exemplary user interface device 402 with an operating system 416 which generates sub-gestures in components based on position data 414 of a multi-finger gesture, according to one embodiment of the present invention. As illustrated in FIG. 4, the user interface device 402 (e.g., a handheld device 404) comprises a display 406 (e.g., optional), a touch sensing surface 408, a processor 410, the operating system 416 and one or more applications 418A and 418B. The touch sensing surface 408 may be laid over the optional display 406 for sensing a multiple-finger gesture applied along the touch sensing surface 408.

In addition, the processor 410 (e.g., which may be implemented using a programmable device 412) generates multiple position data 414 associated with the multi-finger gesture applied to the touch sensing surface 408. Furthermore, a drive 417 of the operating system 416 periodically samples the position data 414 of the fingers, and it generates sub-gestures (e.g., event data) which include geometric shapes formed by the fingers and centroids of the geometric shapes. The operating system 416 can also be used to determine how many fingers are present on the touch-sensing surface 408 based on the position data 414. Moreover, the applications 418A and 418B may receive a subset of the event data 420A and 420B, respectively, rather than accessing the whole event data or whole components of the sub-gestures.

Figure 5:
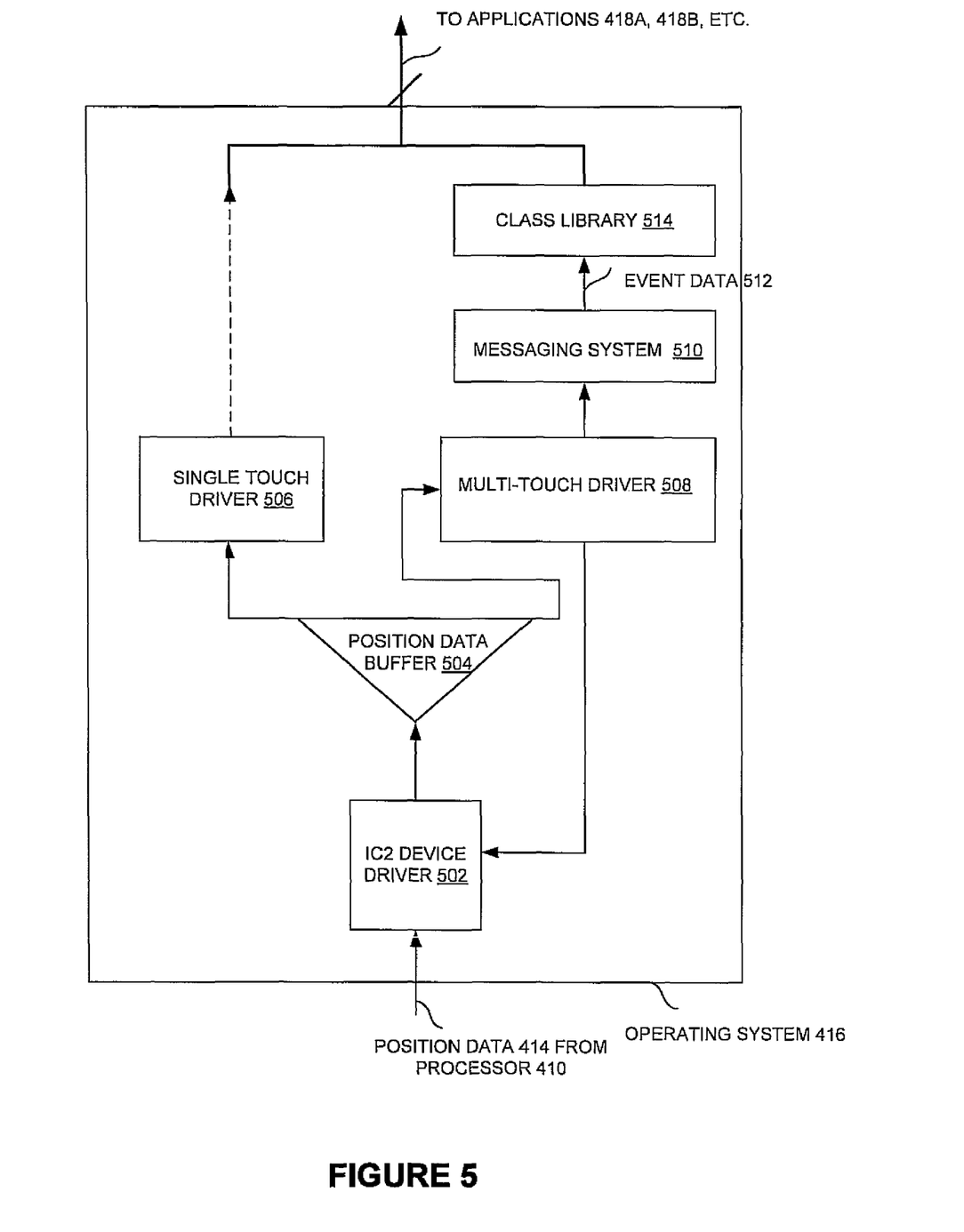
FIG. 5 is an exploded view of the operating system of FIG. 4, according to one embodiment of the present invention.

FIG. 5 is an exploded view of the operating system 416 of FIG. 4, according to one embodiment of the present invention. As illustrated in FIG. 5, the operating system 416 comprises an inter-integrated circuit (IC2) bus driver 502, a position data buffer 504, a single touch driver 506, a multi-touch driver 508, a messaging system 510 and a class library 514. In one embodiment, the operation system 416 may be for minimalistic computers and embedded systems (e.g., Windows CE®, Linux, etc.).

The single touch driver 506 processes single touch (e.g., or finger) gesture, where single x-y coordinates and "finger down/finger up" state are obtained via the IC2 device driver 502 and the position data buffer 504. It is appreciated that the data processed by the single touch driver 506 may be used in a single touch operation similar to a mouse operation for a display of a user interface device.

In one embodiment, the multi-touch driver 508 (e.g., a middleware application which resides in the kernel of the operating system 416) for processing two finger touch generates and/or reports sub-gestures or geometric representations (e.g., primary batons and secondary batons) by processing the position data 414 from the processor 410 in FIG. 4. Then, the information may be posted to a messaging system 510, where native or non-native applications (e.g., MS® .NET applications) and controls can register to receive parts of the information of their interest. It is appreciated that the posting of the information may eliminate the waiting time for interaction or acknowledgement from the applications 418A and 418B.

Figure 6:
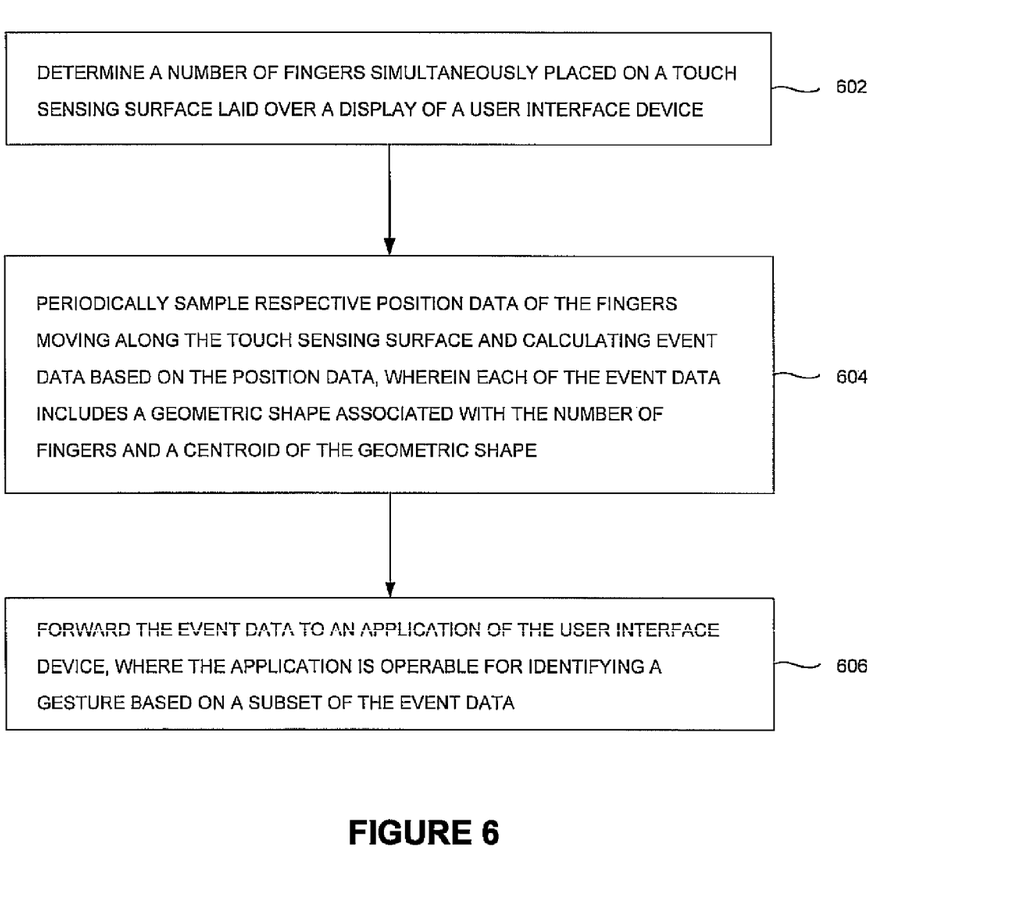
FIG. 6 illustrates a process flow chart of an exemplary method for reporting sub-gesture data used for identification of a multi-finger gesture, according to one embodiment of the present invention.

FIG. 6 illustrates a process flow chart of an exemplary method for reporting sub-gesture data used for identification of a multi-finger gesture, according to one embodiment of the present invention. In operation 602, the number of fingers simultaneously placed on a touch sensing surface laid over a display of a user interface device is determined.

In operation 604, respective position data of the fingers moving along the touch sensing surface are periodically sampled, and event data based on the position data are calculated, where each of the event data includes a geometric shape associated with the number of fingers and a centroid of the geometric shape. In one embodiment, the event data comprises an initial event data for reporting initial placement of the fingers on the touch sensing surface, a final event data for reporting any change in the number of fingers on the touch sensing surface and one or more intermediate event data between the initial event data and the final event data.

In one embodiment, the number of fingers comprises two fingers, where each of the event data comprises a primary report of a straight line or "baton" connecting respective position data of the two fingers. The primary report may be described by the length of the straight line, the center point of the straight line and the angle of the straight line from the y-axis of the display. In addition, the primary report may comprise the angle of the straight line in x-y plane from the z-axis of the display. Moreover, each of the event data comprises a secondary report which represents the distance between the center point of the straight line for the initial event and the center point of the straight line for each intermediate event.

In operation 606, the event data is forwarded to an application of the user interface device, where the application is operable for identifying a gesture based on a subset of the event data. In one embodiment, the application comprises a graphical user interface program of the user interface device. Additionally, the event data may be broadcasted so that the application can subscribe to a portion of the event data as it chooses. Accordingly, the subset of the event data is processed by the application for identification of a gesture which corresponds to the event data, where the gesture is identified using a lookup table with preconfigured finger gestures and/ or a computer code operable for interpreting the subset of event data.

It is appreciated that the methods disclosed in FIG. 6 may be implemented in a form of a machine-readable medium embodying a set of instructions that, when executed by a machine, cause the machine to perform any of the operations disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

What is claimed is:

1. A method of reporting data related to a touch sensing surface of a user interface device, the method comprising:
   determining a number of fingers simultaneously detected on the touch sensing surface;
   periodically sampling respective position data of the fingers moving along the touch sensing surface and calculating event data based on the position data, wherein the event data comprises:
      an initial event data for reporting initial placement of the fingers on the touch sensing surface,
      a final event data for reporting any change in the number of fingers on the touch sensing surface, and
      a plurality of intermediate event data between the initial event data and the final event data, each of the event data comprises:
         a geometric shape associated with the number of fingers and a centroid of the geometric shape,
         a primary report being a straight line connecting respective position data of the number of fingers which comprises a length of the straight line, a center point of the straight line, and an angle of the straight line from a y-axis, and a secondary report representing a distance between the center point of the straight line for the initial event and one of a center point of a respective straight line for the intermediate event; and forwarding the event data for receipt by an application of the user interface device, wherein the application is configured to identify a gesture based on a subset of the event data, the subset including a plurality of secondary reports each measured from the center point of the straight line for the initial event to the centerpoint of each respective straight line for each corresponding intermediate event.

2. The method of claim 1, wherein the number of fingers comprises two fingers.

3. The method of claim 1, wherein the primary report further comprises an angle of the straight line from a z-axis of the display.

4. The method of claim 1, wherein the application comprises a graphical user interface program of the user interface device.

5. The method of claim 1, wherein the forwarding the event data comprises broadcasting the event data to the application, wherein the application is registered for receipt of the event data.

6. The method of claim 1, wherein the forwarding the event data comprises posting of the event data in a messaging system.

7. The method of claim 1, wherein the identifying of the gesture is performed using a lookup table with preconfigured finger gestures.

8. A user interface device, comprising:
a touch sensing surface configured to sense a multiple-finger contact applied by fingers along the touch sensing surface;
a processor configured to generate a plurality of position data associated with the multi-finger contact; and
a driver configured to periodically sample position data of the fingers and to generate event data which comprises a geometric shape formed by the fingers and a centroid of the geometric shape for each sampled position data, an initial event data for reporting initial placement of the fingers on the touch sensing surface, a final event data for reporting any change in the number of fingers on the touch sensing surface and a plurality of intermediate event data between the initial event data and the final event data,
wherein:
each event data comprises a primary report being a straight line connecting respective position data of the number of fingers which comprises a length of the straight line, a center point of the straight line, and an angle of the straight line from a y-axis, and a secondary report representing a distance between the center point of the straight line for the initial event and one of a center point of a respective straight line for the intermediate event, the driver is further configured to identify a gesture based on a subset of the event data, and the subset includes a plurality of secondary reports each measured from the center point of the straight line for the initial event to the centerpoint of each respective straight line for each corresponding intermediate event.

9. The device of claim 8, wherein the fingers comprises two fingers.

10. The device of claim 8, wherein the event data is forwarded to a plurality of applications associated with the touch sensing surface.

11. The device of claim 10, wherein each of the plurality of applications is registered for receipt of the subset of the event data.

12. The device of claim 11, wherein the subset of the event data is processed by each of the plurality of application programs for identification of the multi-finger gesture.

13. The device of claim 8, further comprising a display placed positioned under the touch sensing surface.

14. A non-transitory computer readable medium having instructions that, when executed by a computer, cause the computer to perform a method of processing data comprising:
determining a number of fingers simultaneously detected on the touch sensing surface;
periodically sampling respective position data of the fingers moving along the touch sensing surface and calculating event data based on the position data, wherein each of the event data comprises a geometric shape associated with the number of fingers and a centroid of the geometric shape, an initial event data for reporting initial placement of the fingers on the touch sensing surface, a final event data for reporting any change in the number of fingers on the touch sensing surface and a plurality of intermediate event data between the initial event data and the final event data, a primary report, and a secondary report, the primary report being a straight line connecting respective position data of the number of fingers which comprises a length of the straight line, a center point of the straight line, and an angle of the straight line from a y-axis, and the secondary report representing a distance between the center point of the straight line for the initial event and one of a center point of a respective straight line for the intermediate event; and forwarding the event data for receipt by an application of the user interface device, wherein the application is configured to identify a gesture based on a subset of the event data, the subset including a plurality of secondary reports each measured from the center point of the straight line for the initial event to the centerpoint of each respective straight line for each corresponding intermediate event.

15. The non-transitory computer readable medium of claim 14, wherein the number of fingers comprises two fingers.

* * * * *